(12) United States Patent
Sakamaki

(10) Patent No.: US 9,293,964 B2
(45) Date of Patent: Mar. 22, 2016

(54) POWER TOOL

(71) Applicant: MAX CO., LTD., Tokyo (JP)

(72) Inventor: Kazuya Sakamaki, Tokyo (JP)

(73) Assignee: MAX CO., LTD., Tokyo (JP)

( * ) Notice: Subject to any disclaimer, the term of this patent is extended or adjusted under 35 U.S.C. 154(b) by 200 days.

(21) Appl. No.: 13/893,715

(22) Filed: May 14, 2013

(65) Prior Publication Data

US 2013/0307355 A1     Nov. 21, 2013

(30) Foreign Application Priority Data

May 15, 2012   (JP) ................................ 2012-111312

(51) Int. Cl.
| | |
|---|---|
| *H02K 7/14* | (2006.01) |
| *H02K 9/04* | (2006.01) |
| *B25F 5/00* | (2006.01) |
| *H02K 11/00* | (2006.01) |

(52) U.S. Cl.
CPC ............... *H02K 7/145* (2013.01); *B25F 5/008* (2013.01); *H02K 7/14* (2013.01); *H02K 9/04* (2013.01); *H02K 11/0073* (2013.01)

(58) Field of Classification Search
CPC ............ H02L 7/14; H02L 7/145; H02L 25/00
USPC .......................................... 310/47, 50, 43, 91
See application file for complete search history.

(56) References Cited

U.S. PATENT DOCUMENTS

| | | | | |
|---|---|---|---|---|
| 4,090,098 | A * | 5/1978 | Kranzler et al. ................. | 310/71 |
| 6,317,332 | B1 * | 11/2001 | Weber et al. ................... | 361/760 |
| 2006/0202571 | A1 * | 9/2006 | Wilkinson et al. .............. | 310/50 |
| 2008/0265695 | A1 * | 10/2008 | Yoshida et al. ................. | 310/50 |
| 2010/0253162 | A1 * | 10/2010 | Sakamaki et al. .............. | 310/50 |
| 2011/0227430 | A1 * | 9/2011 | Omori et al. .................... | 310/50 |

FOREIGN PATENT DOCUMENTS

| | | |
|---|---|---|
| CN | 101295897 A | 10/2008 |
| JP | A-2003-322082 | 11/2003 |
| JP | A-2006-315119 | 11/2006 |
| JP | A-2006-333587 | 12/2006 |
| JP | A-2006-340555 | 12/2006 |
| JP | 2007268634 A * | 10/2007 |
| JP | 4436033 B2 | 3/2010 |

OTHER PUBLICATIONS

Agehara, Norimoto; Yamashita, Michio, Power Tool, Oct. 18, 2007, Max Co., LTD, JP2007268634 (English Machine Translation).*

* cited by examiner

*Primary Examiner* — Terrance Kenerly
*Assistant Examiner* — Alexander Singh
(74) *Attorney, Agent, or Firm* — Drinker Biddle & Reath LLP

(57) ABSTRACT

A power tool includes a housing, a motor accommodated in the housing, a cooling fan arranged coaxially with the motor, a trigger switch configured to activate the motor, a motor control board on which a switching device is mounted to drive the motor, and a coupling unit provided below a bottom surface of the motor. The motor control board is fixed to the motor via the coupling unit such that the motor control board is disposed below the motor and above the trigger switch.

9 Claims, 7 Drawing Sheets

POWER TOOL

CROSS-REFERENCE TO RELATED APPLICATION(S)

The present application claims priority to Japanese Patent Application No. 2012-111312, filed on May 15, 2012, the entire content of which is incorporated herein by reference.

TECHNICAL FIELD

The present invention relates to a power tool including a motor.

BACKGROUND

A related art power tool includes a motor such as a brushless DC motor. In the power tool, a switching device, such as an FET, for driving the brushless DC motor is frequently turned on and off to precisely control the rotation of the motor so that, for example, the rotation speed is maintained constant in a case where a battery output starts to fall down.

However, frequently turning the switching device on and off causes a generation of intense heat due to switching loss.

Accordingly, a motor control board equipped with the switching device is cooled by, for example, a cooling fan. The cooling fan sucks air from an inlet port provided in a housing thereby to generate cooling air to cool the motor or the control board using the air. The air for use in the cooling is discharged from an outlet port provided in the housing. In general, the cooling fan is disposed coaxially with the motor.

If the motor control board is disposed on an axis of the motor, the motor control board is effectively cooled. However, an axial size of the tool is increased.

JP 4436033 B2 discloses a configuration capable of reducing an entire size of the tool, in which a motor control board is disposed in a space between a motor and a trigger switch, a plurality of switching devices are mounted on the motor control board in a state in which the elements are fixed to an L-shaped heat sink, and the heat sink is disposed at a rear of the motor in an axial direction.

SUMMARY

It is an object of the present invention to further reduce the entire size of a tool and to ensure cooling of a switching device by reducing a size of a motor control board and by arranging the downsized motor control board in a space between a motor and a trigger switch.

According to an aspect of the present invention, a power tool includes a housing, a motor accommodated in the housing, a cooling fan arranged coaxially with the motor, a trigger switch configured to activate the motor, a motor control board on which a switching device is mounted to drive the motor, and a coupling unit provided below the motor. The motor control board is fixed to the motor via the coupling unit such that the motor control board is disposed below the motor and above the trigger switch.

Other aspects and advantages of the present invention will be apparent from the following description, the drawings, and the claims.

DETAILED DESCRIPTION

Hereinafter, an embodiment of the present invention will be described with reference to the drawings.

A power tool 10 according to the embodiment is an impact driver equipped with a motor 15.

Figure 1:
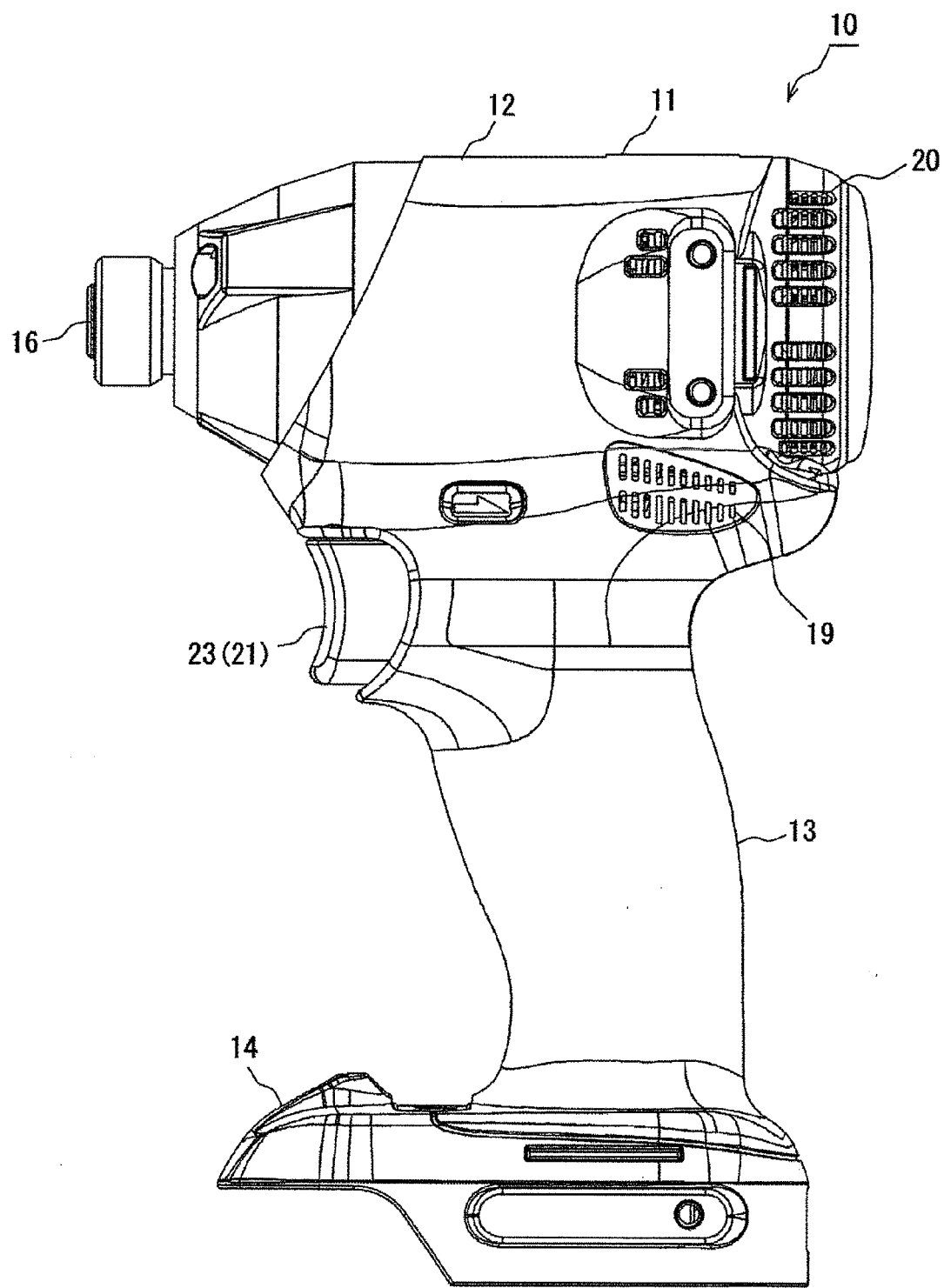
FIG. 1 is a side view of a power tool.

As illustrated in FIG. 1, a housing 11 of the power tool 10 includes a tubular output part 12, a grip part 13 extending from a lower portion of the output part 12 in a direction substantially perpendicular to the output part 12, and a battery pack mounting part 14 provided at a lower portion of the grip part 13.

Figure 2:
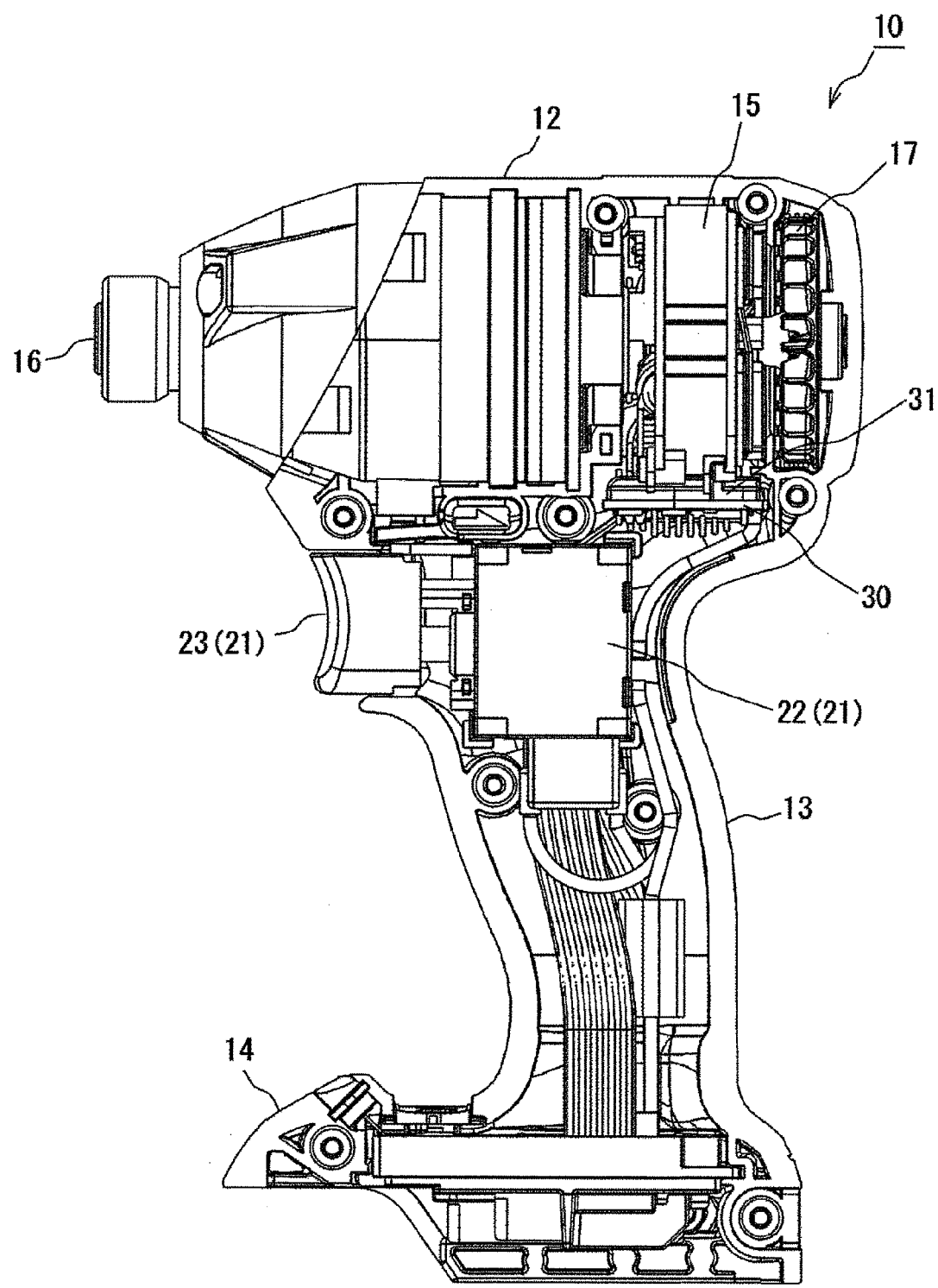
FIG. 2 is a side view illustrating an internal structure of the power tool.

As illustrated in FIG. 2, the motor 15 is built in the output part 12. The output part 12 is provided therein with a cooling fan 17, a spindle, an impact mechanism, and an anvil, which are not illustrated, and they are installed in series coaxially with a rotation shaft of the motor 15. Below the motor 15, a motor control board 30 configured to control the motor 15 is disposed. The motor control board 30 is disposed in a space between the motor 15 and a trigger switch 21 at a connection position between the output part 12 and the grip part 13 in such a manner that a surface of the motor control board 30 faces the motor 15. The motor control board 30 is connected to the trigger switch 21, a lighting operation board not illustrated but provided near the battery pack mounting part 14, and a battery, via electric wires and the like.

A front end of the anvil is provided with an output shaft 16. A driver bit (tip tool) can be mounted to the output shaft 16. If the motor 15 is driven in a state in which the driver bit is attached to the output shaft 16, the driver bit is rotated by a driving force of the motor 15 to fasten a screw.

The cooling fan 17 is disposed at the rearmost portion of the output shaft 12, and is rotated synchronous with the rotation of the motor 15. Accordingly, fresh air is sucked from an inlet port 19 (see FIG. 1) which is opened on a lateral portion of the housing 11, and the sucked air is discharged outwardly from an outlet port 20 (see FIG. 1) which is opened on the lateral portion of the housing 11.

The inlet port 19 is provided at the side of the motor control board 30, and the outlet port 20 is provided at the side of the cooling fan 17. Accordingly, when the cooling fan 17 is operated, the cooling air sucked by the cooking fan 17 from the intake port 19 passes through the inside of the motor 15 from the vicinity of the motor control board 30, and then is discharged outward from the outlet port 20, thereby effectively cooling a coil of the motor 15 and the motor control board 30.

The grip part 13 is a part for allowing an operator to grip the power tool 10. As illustrated in FIG. 1, the trigger switch 21 is disposed at the front of the power tool 10 near a boundary line between the output part 12 and the grip part 13.

The trigger switch 21 is configured to activate the motor 15. As illustrated in FIG. 2, the trigger switch 21 has a box-like switch body 22 receiving a contact point of the switch, and a trigger portion 23 which can be pushed against the switch body 22. The trigger switch 21 is accommodated in the grip part 13. The trigger portion 23 protrudes outwardly from the housing 11, so that the trigger portion can be operated. As the trigger portion 23 is triggered, the motor 15 starts to rotate, thereby initiating the operation of the power tool 10. The trigger portion 23 is disposed at a position so that it is caught by an index finger when the grip part 13 is grasped.

The motor 15 is a brushless DC motor of three-phase alternating current, and is driven by turning a switching device 30a, such as FET, on and off. The switching device 30a is mounted on the motor control board 30.

Figure 3:
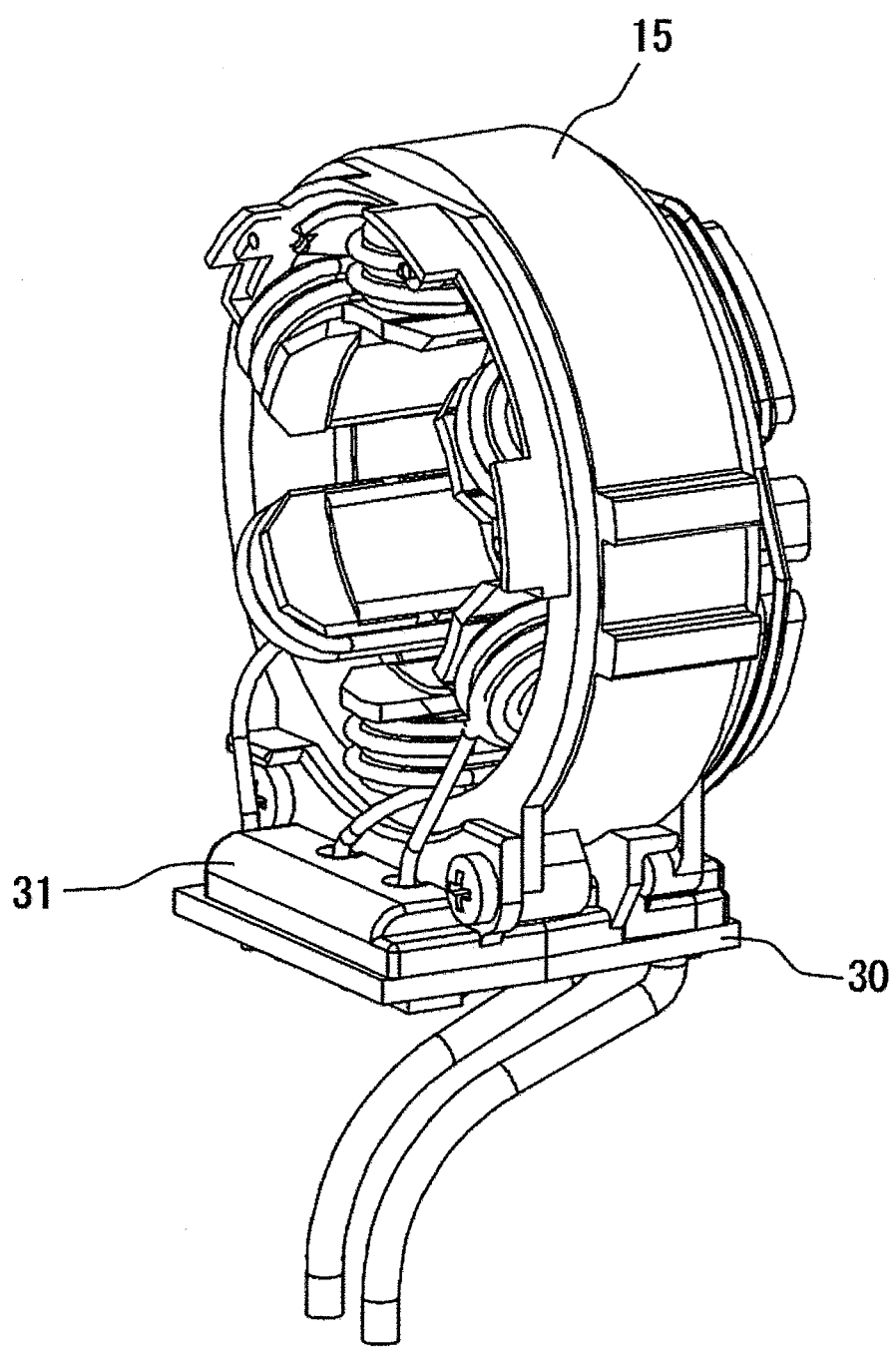
FIG. 3 is an enlarged perspective view of a motor and a motor control board.

As illustrated in FIG. 3, the motor control board 30 is fixed to the motor 15, and a coupling unit 31 installed below a bottom surface of the motor 15 is interposed between the motor 15 and motor control board 30. Accordingly, as illustrated in FIG. 2, the motor control board 30 is disposed in a space between the motor 15 and the trigger switch 21.

Figure 5A:
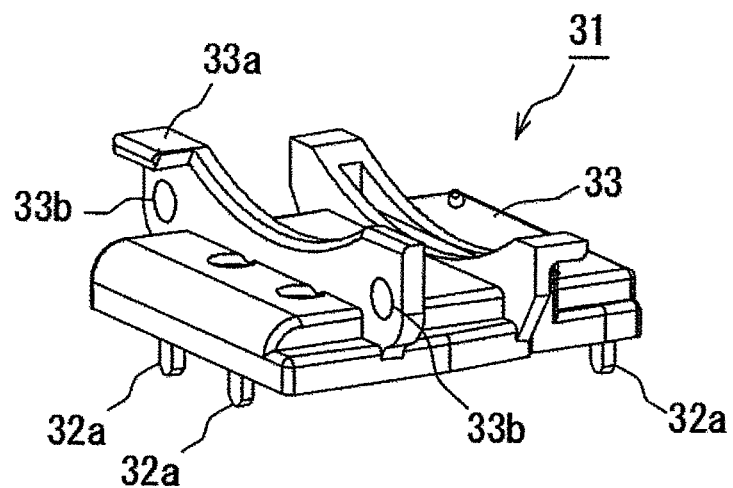
FIG. 5A is a perspective view of a coupling unit when seen from a top at an angle.
Figure 5B:
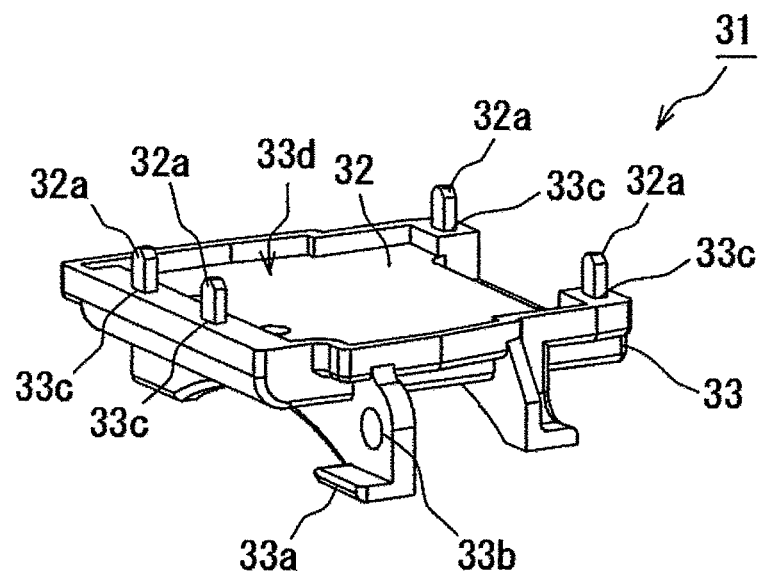
FIG. 5B is a perspective view of the coupling unit when seen from a bottom at an angle.

As illustrated in FIGS. 5A and 5B, the coupling unit 31 has a metallic junction plate 32 serving as a conduction portion, and a plate cover 33 made of resin installed to cover the junction plate 32.

The junction plate 32 is insert-molded with the plate cover 33, and only leg portion 32a of the junction plate 32 is exposed.

An upper portion of the plate cover 33 is provided with a protrusion 33a. The protrusion 33a is penetrated by fixing holes 33b. A rear surface of the plate cover 33 is provided with a concave portion 33d having the substantially same size as the junction plate 32.

Figure 6A:
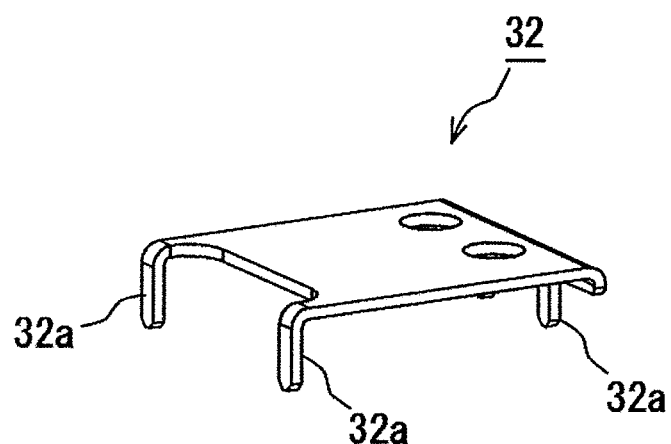
FIG. 6A is a perspective view of a junction plate when seen from a top at an angle.
Figure 6B:
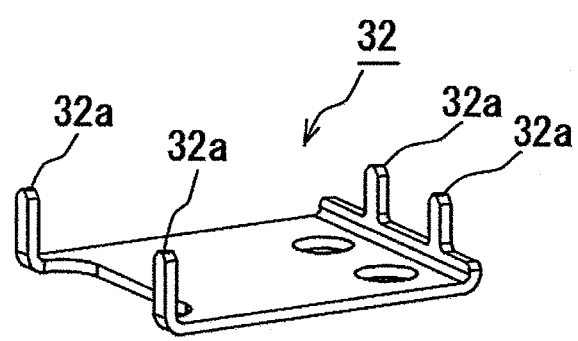
FIG. 6B is a perspective view of the junction plate when seen from a bottom at an angle.

As illustrated in FIGS. 6A and 6B, the junction plate 32 is formed by bending an end portion of a board-like metallic member at a substantially right angle. The junction plate 32 has four leg portions 32a in total, in which two legs are in front and two legs are in rear. The number and position of the legs are optional. As illustrated in FIG. 5B, when the junction plate 32 is fixed to the plate cover 33, the leg portions 32a protrude outwardly from leg portion through-holes 33c of the plate cover 33.

Figure 4:
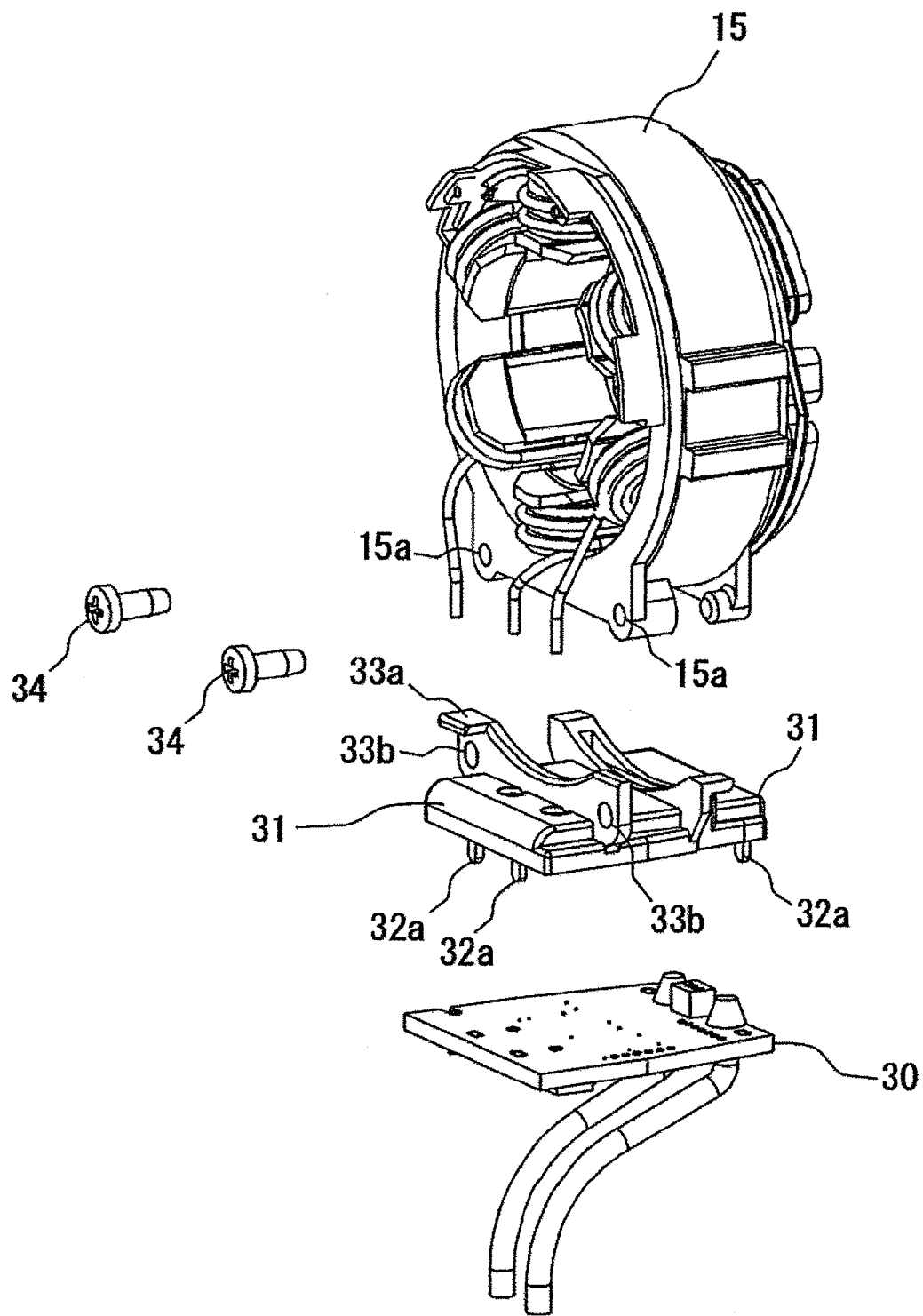
FIG. 4 is an exploded perspective view of the motor and the motor control board.

When the motor 15 and the coupling unit 31 are fixed, screws 34 penetrate the fixing holes 33b of the plate cover 33, and then are screwed to screw holes 15a of the motor 15 (see FIG. 4).

When the coupling unit 31 and the motor control board 30 are fixed, the leg portions 32a of the junction plate 32 are inserted into junction plate connecting portions 30c of the motor control board 30, and then the leg portions 32a are fixed to the junction plate connecting portions 30c by soldering.

Figure 7A:
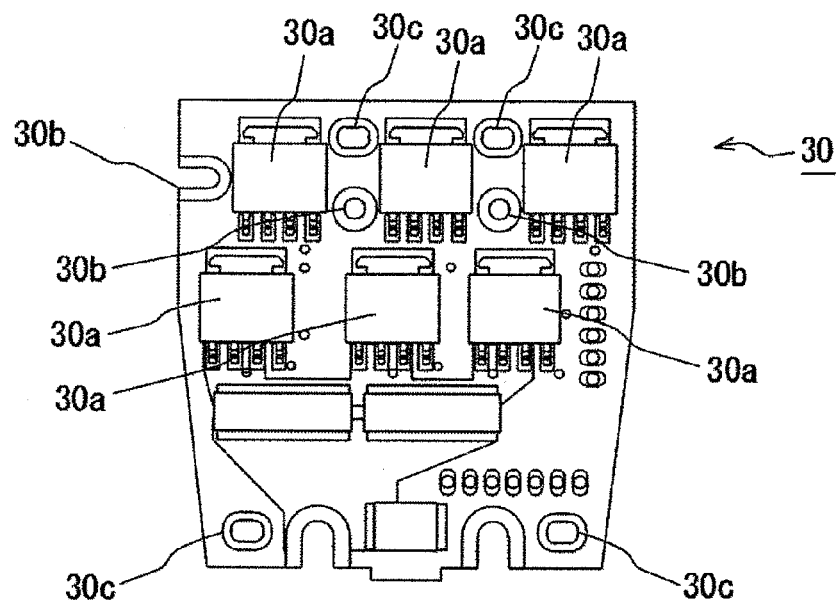
FIG. 7A is a plan view of the motor control board.
Figure 7B:
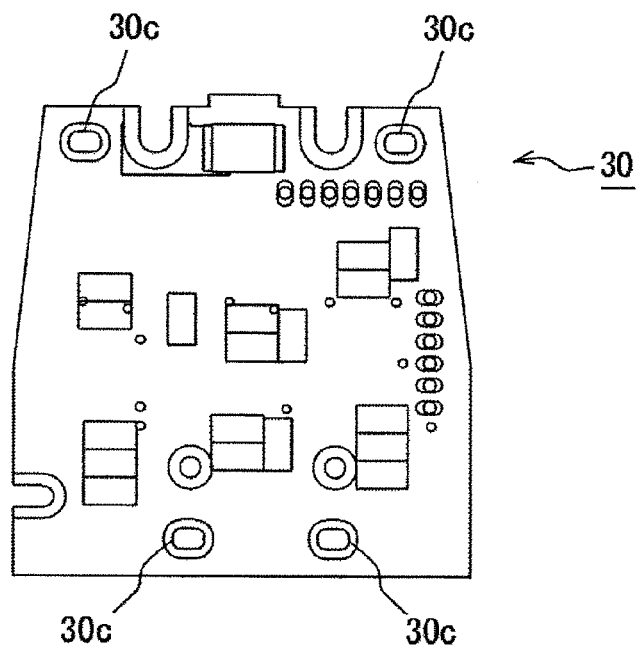
FIG. 7B is a bottom view of the motor control board.

As illustrated in FIGS. 7A and 7B, the motor control board 30 is formed in a shape of a substantially rectangular thin plate. Six switching devices 30a are mounted on the surface of the motor control board 30 to convert the supply of power in a U-phase, a V-phase, and a W-phase of the motor 15. The motor control board 30 has three motor coil connecting portions 30b which are connected to coils of the motor 15. The motor control board 30 is provided with a pattern to connect the switching devices 30a and the motor coil connecting portions 30b.

The pattern is configured so that a portion (in particular, a long connection portion) of the wiring is omitted. That is, the circuit is not completed only by the motor control board 30. The junction plate connecting portions 30c are formed at a position corresponding to an end of the omitted wiring. The as the leg portions 32a of the junction plate 32 are inserted and fixed to the junction plate connecting portions 30c by soldering, each of the junction plate connecting portions is electrically connected to each other. That is, the junction plate 32 serves as a jumper for completing the circuit on the motor control board 30.

The motor control board 30 is fixed to the junction plate 32 by soldering. The motor control board 30 is further fixed to the junction plate 32 by an adhesive for coating the surface of the motor control board 30.

As described above, according to this embodiment, the motor control board 30 is fixed to the motor 15 via the coupling unit 31 provided below the motor 15 (e.g., at the bottom surface of the motor 15). For this reason, since it is not necessary to provide the motor control board 30 with a screw bearing surface, the motor control board 30 can be reduced in size. The downsized motor control board 30 is disposed below the motor 15 and above the trigger switch 21 (e.g., in the space between the bottom surface of the motor 15 and the upper surface of the trigger switch 21), so that the reduction in axial length of the entire tool and the cooling of the switching devices 30a are both realized. Further, since the entire tool is downsized, it is possible to reduce in weight of the tool.

The coupling unit 31 has the junction plate 32 as an electrically conductive portion. The motor control board 30 is fixed to the junction plate 32 by soldering, and thus is fixed to the motor. Also, the junction plate 32 is configured to serve as the jumper to complete the circuit on the motor control board 30. For this reason, since a pattern of a power line occupying a large ratio in an area of the motor control board 30 can be omitted, the motor control board 30 can be further downsized.

The motor control board 30 is fixed to the junction plate 32 by the adhesive for coating the motor control board 30. Using the adhesive can obtain an effect, such as insulation of the motor control board, and can absorb vibration of the motor 15 to render the motor control board 30 not to have an effect of the vibration.

In the above-described embodiment, the coupling unit 31 is provided as a separate body with respect to the motor 15, but the present invention is not limited thereto. For example, the coupling unit 31 may be formed integrally with the motor 15.

Further, in the above-described embodiment, although the coupling unit 31 and the motor control board 30 are fixed to each other by the soldering, the present invention is not limited thereto, and they may be fixed by the adhesive or the like. Similarly, the motor control board 30 and the junction plate 32 are fixed to each other by the soldering, but may be fixed to each other by riveting or adhesive.

What is claimed is:

1. A power tool comprising:
a housing;
a motor accommodated in the housing;
a cooling fan arranged coaxially with the motor;
a trigger switch configured to activate the motor;
a motor control board on which a switching device is mounted to drive the motor; and
a coupling unit provided below the motor,
wherein the motor control board is fixed to the motor via the coupling unit such that the motor control board is disposed below the motor and above the trigger switch,
wherein the coupling unit comprises a metallic junction plate and a resin plate cover insert-molded on the metallic junction plate,
wherein the motor control board is fixed to the metallic junction plate such that the coupling unit and the motor control board are fixed to each other by the metallic junction plate, and wherein the metallic junction plate is configured as a jumper to complete a circuit on the motor control board.

2. The power tool according to claim 1, wherein the motor control board is fixed to the metallic junction plate by soldering.

3. The power tool according to claim 1, wherein the motor control board is fixed to the coupling unit by an adhesive.

4. The power tool according to claim 3, wherein the motor control board is coated with the adhesive.

5. The power tool according to claim 1, wherein the motor has a screw hole, wherein the resin plate cover of the coupling unit has an upper surface which faces the motor, the upper surface including a protrusion which is formed with a fixing hole, and wherein the motor and the coupling unit are fixed while a screw is screwed through the screw hole and the fixing hole.

6. The power tool according to claim 5, wherein the screw is screwed through the screw hole of the motor and the fixing hole of the resin plate cover in a direction in parallel with a rotational axis of the motor.

7. The power tool according to claim 5, wherein the metallic junction plate includes a plurality of leg portions which are inserted into and fixed to junction plate connecting portions of the motor control board by soldering to complete the circuit on the motor control board.

8. The power tool according to claim 1, wherein the housing is formed with an inlet port in a vicinity of the motor control board and is formed with an outlet port in a vicinity of the cooling fan.

9. The power tool according to claim 8, wherein when the cooling fan is operated, a cooling air suctioned by the cooling fan passes through an inside of the motor from a vicinity of the motor control board and is discharged outward from the outlet port.

* * * * *